(12) United States Patent
Herrala et al.

(10) Patent No.: US 10,174,725 B1
(45) Date of Patent: Jan. 8, 2019

(54) FUEL PUMP COOLANT CAP ASSEMBLY

(71) Applicant: GM GLOBAL TECHNOLOGY OPERATIONS LLC, Detroit, MI (US)

(72) Inventors: Kevin W. Herrala, Grand Blanc, MI (US); Michael Kaczmar, Farmington Hills, MI (US); Matthew T. Hamilton, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/847,013

(22) Filed: Dec. 19, 2017

(51) Int. Cl.
*F02M 31/20* (2006.01)
*F02M 37/14* (2006.01)

(52) U.S. Cl.
CPC ............ *F02M 31/20* (2013.01); *F02M 37/14* (2013.01)

(58) Field of Classification Search
CPC .. F02M 31/20; F02M 35/10216; F02M 37/04; F02M 37/14; F02M 39/005; F04D 13/0686; F04D 29/5813
See application file for complete search history.

(56) References Cited

U.S. PATENT DOCUMENTS

| | | | | |
|---|---|---|---|---|
| 5,908,020 A | * | 6/1999 | Boutwell | B01D 35/027 123/41.31 |
| 6,231,318 B1 | * | 5/2001 | Cotton | B01D 35/027 123/509 |
| 6,422,207 B1 | * | 7/2002 | Kolb | F02M 31/20 123/457 |
| 6,422,255 B1 | * | 7/2002 | Hartke | B60K 15/035 123/516 |
| 6,581,579 B1 | * | 6/2003 | Knight | F02M 31/20 123/516 |
| 7,013,878 B1 | * | 3/2006 | Cotton | F02M 37/20 123/41.31 |
| 2005/0100461 A1 | * | 5/2005 | Izutani | B01D 35/027 417/423.8 |
| 2009/0071448 A1 | * | 3/2009 | Smith | F02M 37/20 123/516 |
| 2009/0183715 A1 | * | 7/2009 | Yamamoto | F02M 37/0082 123/497 |
| 2013/0133765 A1 | * | 5/2013 | Israelson | F04D 5/002 137/565.13 |
| 2013/0255805 A1 | * | 10/2013 | Ikeya | F04B 23/02 137/565.37 |

* cited by examiner

*Primary Examiner* — Long T Tran

(57) ABSTRACT

A fuel pump coolant assembly includes a fuel pump cap having a flanged bottom surface and a fuel pump support structure. A fuel cooling ring disposed between the fuel pump cap and the fuel pump support structure, wherein a sealed coolant cavity is formed by a portion of an external surface of the fuel pump support structure and an internal surface of the fuel cooling ring.

17 Claims, 4 Drawing Sheets

US 10,174,725 B1

FUEL PUMP COOLANT CAP ASSEMBLY

FIELD

The present disclosure relates to engine fuel pump assemblies, and more specifically to a fuel pump coolant cap assembly.

BACKGROUND

The statements in this section merely provide background information related to the present disclosure and may not constitute prior art.

Engine assemblies may include fuel systems that incorporate a variety of types of fuel pumps to provide a pressurized fuel supply. High pressure fuel pumps may be used in direct-injection engines. High pressure fuel pumps may typically be mounted in the cylinder head and may be driven by the camshaft of an overhead cam configured engine assembly.

However, mounting the fuel pump in the cylinder head can cause elevated fuel temperature/boiling issues that occur as a result of conductive heat transfer through the pump mounting interface. This is becoming a more pronounced issue as emissions requirements drive ever-higher fuel pressures. The increased temperatures result as a combination of the pressure increase, and conductive heat transfer to the pump body.

Accordingly, it is desirable to have an engine fuel pump assembly that addresses the fuel temperature and emissions issues caused by heat transfer between the mounting surface and the fuel pump.

SUMMARY

A fuel pump coolant cap assembly in accordance with an exemplary embodiment includes a fuel pump cap having a flanged bottom surface, a fuel pump support structure, and a fuel cooling ring disposed between the fuel pump cap and the fuel pump support structure, wherein a sealed coolant cavity is formed by a portion of an external surface of the fuel pump support structure and an internal surface of the fuel cooling ring.

Another aspect in accordance with the exemplary embodiment further includes a thermal barrier layer disposed between a top surface of the fuel cooling ring and the flanged bottom surface of the fuel pump cap. And another aspect the thermal barrier layer is a thermal barrier coating. And still another aspect wherein the thermal barrier layer is a gasket. And yet another aspect includes a thermal barrier layer disposed between a bottom surface of the fuel cooling ring and a mating surface of the fuel pump support structure. And another aspect wherein the fuel cooling ring further includes a coolant input port and a coolant output port in communication with the sealed coolant cavity.

Still another aspect in accordance with the exemplary embodiment wherein the fuel cooling ring further includes a phase change fluid injection port in communication with the sealed coolant cavity. And another aspect further includes a first O-ring disposed adjacent a top end of the sealed coolant cavity and between the external surface of the fuel pump support structure and an internal surface of the fuel cooling ring. And yet another aspect further includes a second O-ring disposed adjacent a bottom end of the sealed coolant cavity and between the external surface of the fuel pump support structure and an internal surface of the fuel cooling ring.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
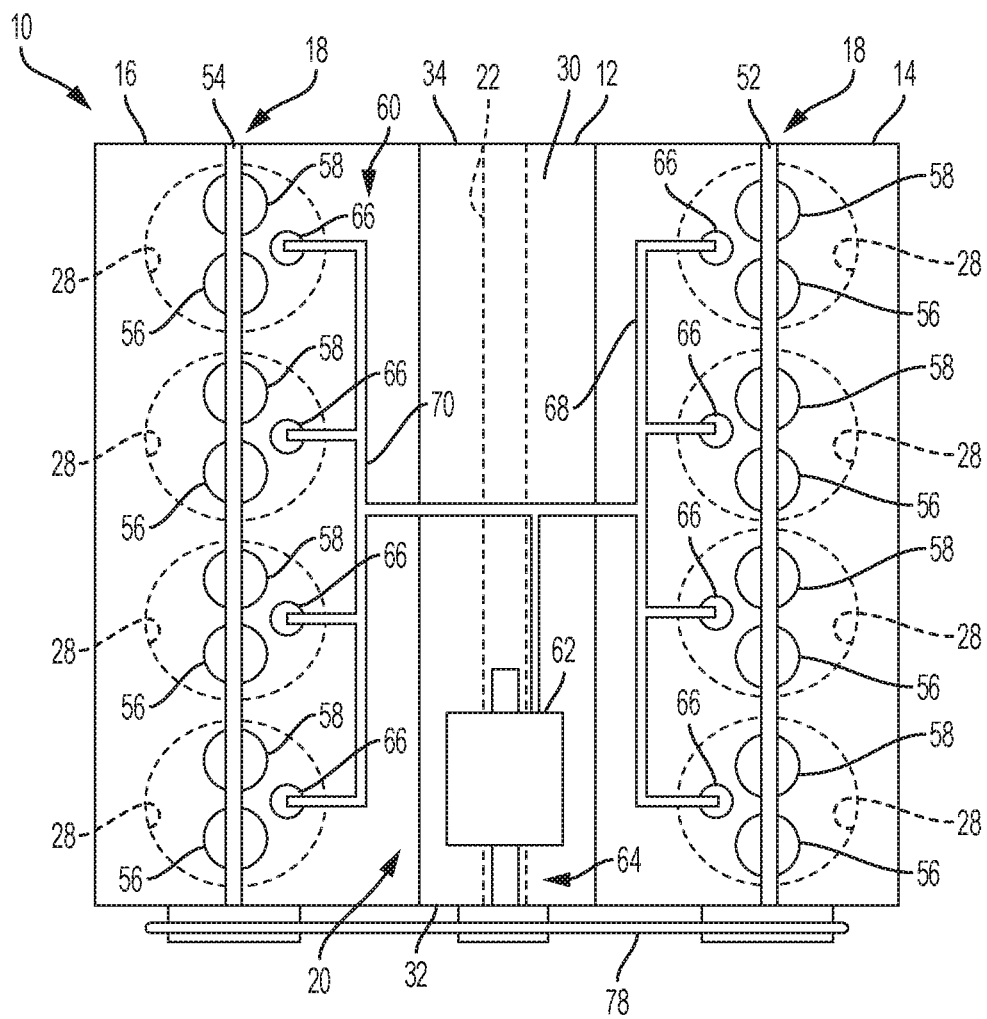
FIG. 1 is a schematic illustration of an engine assembly in accordance with aspects of an exemplary embodiment.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine block 12, first and second cylinder heads 14, 16, a valvetrain assembly 18, a fuel system 20, and a crankshaft 22.

Figure 2:
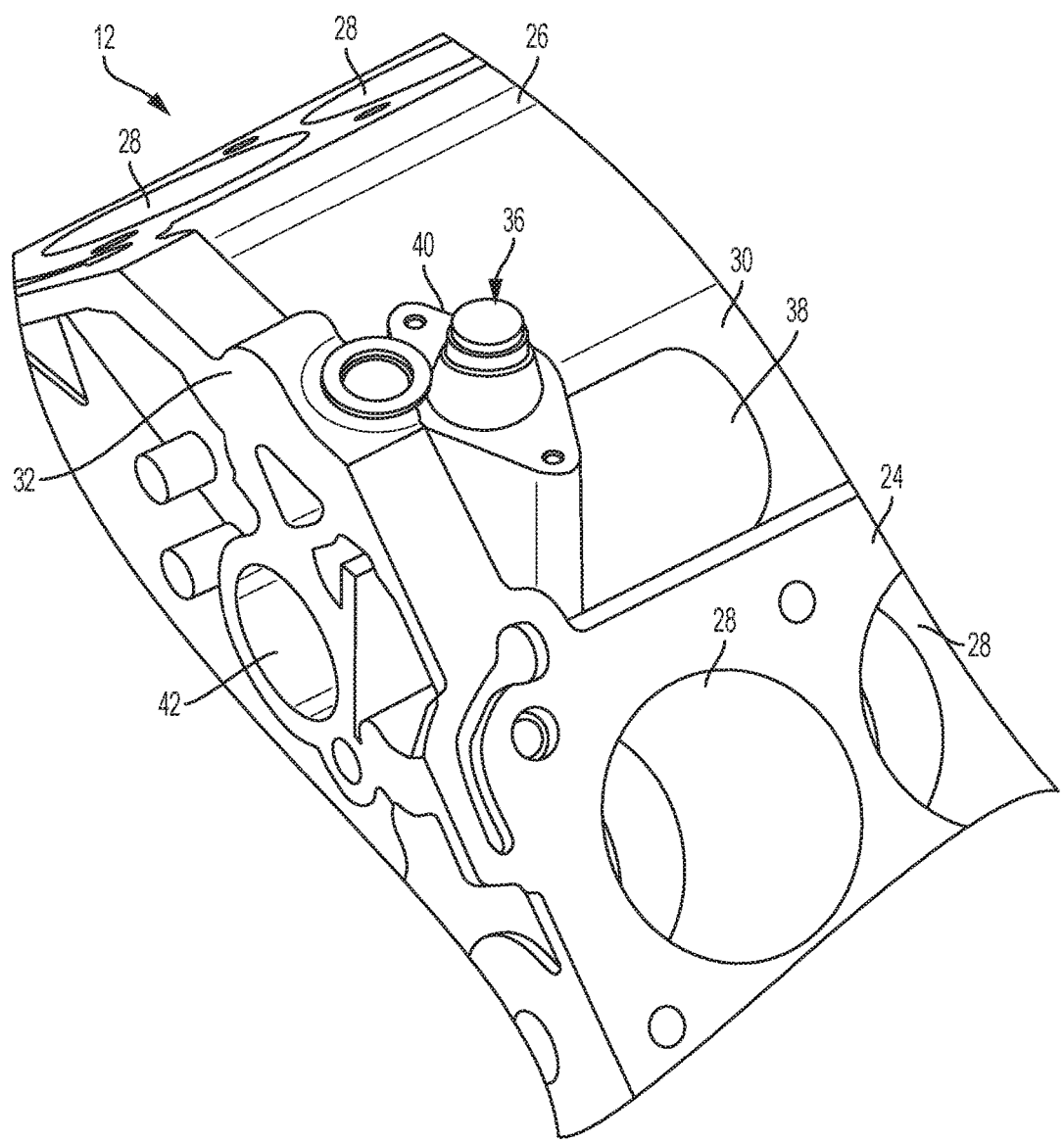
FIG. 2 is a fragmentary perspective view of the engine block of FIG. 1 in accordance with aspects of the exemplary embodiment.

As seen in FIG. 2, the engine block 12 may be a cast structure and may include first and second banks 24, 26 of cylinders 28. The first and second banks 24, 26 may be disposed at an angle relative to one another to form a V-configuration that defines a valley 30 between the first and second banks 24, 26. The crankshaft 22 may be rotatably supported by the engine block 12 below the valley 30. A first wall 32 may extend between the first and second banks 24, 26 at a first end of the valley 30 and a second wall 34 may extend between the first and second banks 24, 26 at a second end of the valley 30. The engine block 12 may further include a fuel pump support structure 36 that is located within the valley 30 between the first and second banks 24, 26 and between the first and second walls 32, 34. The fuel pump support structure 36 may be a stand-alone component that can be fastened to the engine block 12, or may be a die cast feature that can be machined as an integral part of the engine block 12. The fuel pump support structure 36 includes and external surface upon which a portion of the fuel pump coolant cap assembly is disposed as will be further described below. It is appreciated that fuel pump support structure 36 may be disposed in a cylinder head, on part of a cam bearing cap structure, in a cam cover, or other location on the engine block 12 without exceeding the scope of the exemplary embodiment.

Figure 4:
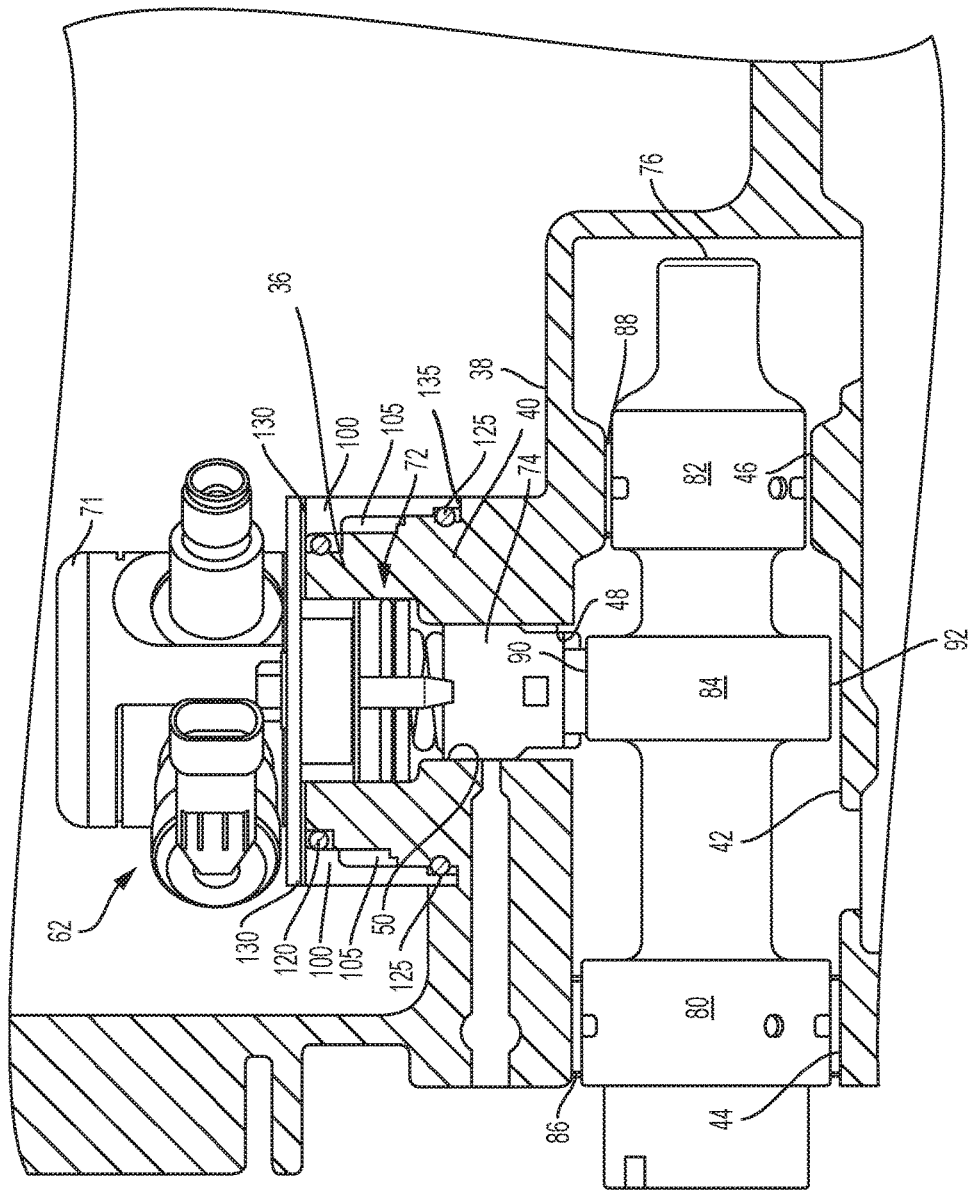
FIG. 4 is an illustration of a cross sectional view of the fuel pump coolant assembly of FIG. 3a in accordance with aspects of the exemplary embodiment.

As seen in FIGS. 2 and 4, the fuel pump support structure 36 may include a shaft housing 38 and a pump mount member 40. The shaft housing 38 may define a bore 42 that includes first and second bearing regions 44, 46 and an opening 48 that extends into the shaft housing 38 and is located axially between the first and second bearing regions 44, 46. The pump mount member 40 may extend from the shaft housing 38 and may include an opening 50 aligned with the opening 48 in the shaft housing 38.

Referring back to FIG. 1, the first cylinder head 14 may be fixed to the first bank 24 of engine block 12 and the second cylinder head 16 may be fixed to the second bank 26. The valvetrain assembly 18 may include a first camshaft 52 that is supported by the first cylinder head 14 and a second camshaft 54 that is supported by the second cylinder head 16 to form an overhead cam engine configuration. The valvetrain assembly 18 may further include intake and exhaust valves 56, 58 for each cylinder 28 that are actuated by the first and second camshafts 52, 54.

Figure 3B:
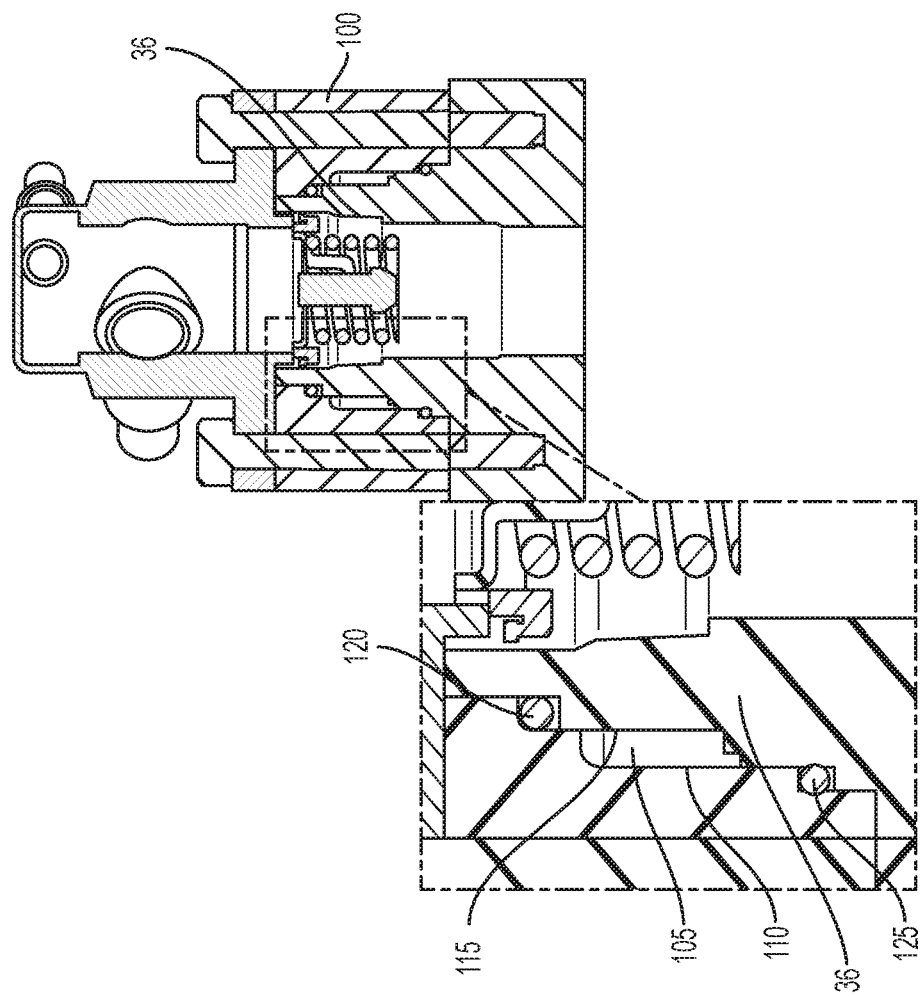
FIG. 3b is an illustration of a fragmentary section the fuel pump coolant assembly of FIG. 3a in accordance with aspects of an exemplary embodiment.
Figure 3A:
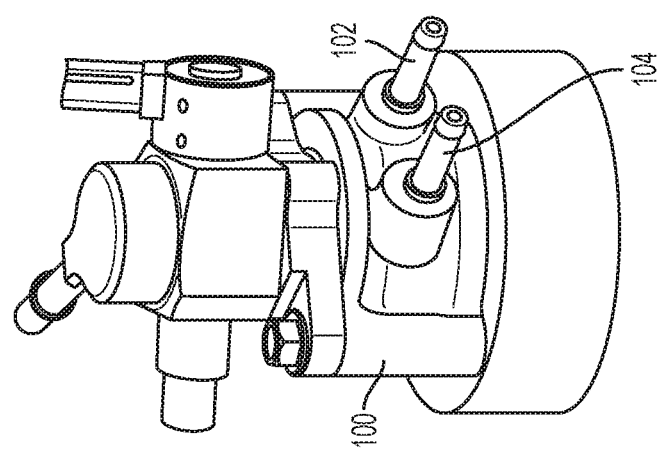
FIG. 3a is an illustration of a fuel pump coolant assembly in accordance with aspects of an exemplary embodiment.

Referring to FIGS. 1, 3A and 3B, the fuel assembly may include a fuel delivery system 60, a fuel pump coolant cap assembly 62, and a fuel pump drive system 64. The fuel delivery system 60 may include fuel injectors 66 and first and second fuel rails 68, 70. The first and second fuel rails 68, 70 may be in communication with the fuel injectors 66 to provide fuel to each of the cylinders 28. The fuel injectors 66 may include direct-injection fuel injectors that are in direct communication with the cylinders 28 to form a direct-injection fuel system.

The fuel pump coolant cap assembly 62 may be in communication with the first and second fuel rails 68, 70 to provide a pressurized fuel supply to the cylinders 28. The fuel pump coolant cap assembly 62 may be fixed to the pump mount member 40 fixed in the valley 30 of the engine block 12. The fuel pump coolant cap assembly 62 may therefore be surrounded by the cast structure of the engine block 12. For example, the fuel pump coolant cap assembly 62 may be located between the first and second banks 24, 26 of cylinders 28 and between the first and second walls 32, 34.

The fuel pump coolant cap assembly 62 may include a fuel pump cap having a flanged bottom surface 71 and a drive mechanism 72 (see FIG. 4). The a fuel pump cap having a flanged bottom surface 71 may include a reciprocating pump fixed to the pump mount member 40 and the drive mechanism 72 may include a lifter mechanism 74 that extends through the openings 48, 50 in the fuel system support structure 36 and engages the fuel pump drive system 64. The fuel pump coolant cap assembly 62 may include a high pressure fuel pump that operates at pressures greater than 10,000 kilopascal (kPa).

Referring now to FIGS. 3A & 3B, the fuel pump coolant cap assembly 62 further includes a fuel cooling ring 100 disposed between the fuel pump cap 71 and the fuel pump support structure 36, wherein a sealed coolant cavity 105 is formed by a portion of an external surface 115 of the fuel pump support structure 36 and an internal surface 110 of the fuel cooling ring 100. The fuel cooling ring 100 includes and coolant inlet port 102 and a coolant outlet port 104 in fluid communication to allow coolant flow through the sealed coolant cavity 105. In this case, the fuel cooling ring 100 uses coolant to reduce the temperature conducting up from the engine block 12 to the fuel pump cap 71.

A phase change fluid injection port (not shown) may also be disposed in the fuel cooling ring 100 and in fluid communication with the sealed coolant cavity 105. In such case, a phase change material (PCM) may be injected into the seal coolant cavity to create a thermal barrier to reduce the temperature conducting up from the engine block 12 to the fuel pump cap 71. The PCM is injected once retained for repeated use as opposed to and active cooling mechanism as described above using inlet and outlet coolant ports.

A first O-ring 120 disposed adjacent a top end of the sealed coolant cavity 105 and between the external surface 115 of the fuel pump support structure 36 and an internal surface 110 of the fuel cooling ring 100. Also, a second O-ring 125 may be disposed adjacent a bottom end of the sealed coolant cavity 105 and between the external surface 115 of the fuel pump support structure 36 and an internal surface 110 of the fuel cooling ring 100. The first and second O-rings operate to ensure that the fluid seal is maintained about the coolant cavity. Further, a thermal barrier layer 130 may be disposed between a top surface of the fuel cooling ring 100 and the flanged bottom surface of the fuel pump cap 71 (see FIG. 4). Still further, a thermal barrier layer 135 disposed between a bottom surface of the fuel cooling ring 100 and a mating surface 40 of the fuel pump support structure 36. The thermal barrier may be in the form of a thermal barrier coating or a thermal barrier gasket.

The fuel pump drive system 64 may include a drive shaft 76 that is driven by the crankshaft 22. The drive shaft 76 may be located within the bore 42 of the shaft housing 38 and may be engaged with the crankshaft 22 through a belt arrangement 78. For example, the belt arrangement 78 may include an accessory drive belt that is drivingly engaged with the drive shaft 76 and the first and second camshafts 52, 54. The drive shaft 76 may be driven at a rotational speed that is less than the rotational speed of the crankshaft 22 and greater than the rotational speed of the first and second camshafts 52, 54. In the present example, the first and second camshafts 52, 54 may be driven at one-half of the rotational speed of the crankshaft 22. In another non-limiting example, the drive shaft 76 may be driven at two-thirds of the rotational speed of the crankshaft 22.

The drive shaft 76 may include first and second bearing portions 80, 82 and a lobed portion 84. The first bearing portion 80 may be rotatably supported by a first bearing 86 at the first bearing region 44 of the shaft housing 38 and the second bearing portion 82 may be rotatably supported by a second bearing 88 at the second bearing region 46 of the shaft housing 38. The lobed portion 84 may be located axially between the first and second bearing portions 80, 82 and may be aligned with the openings 48, 50 in the fuel system support structure 36. The lobed portion 84 may include first and second lobes 90, 92. The drive mechanism 72 of the fuel pump 62 may be engaged with the lobed portion of the drive shaft 76. The present example shows the lifter mechanism 74 being displaced by the first and second lobes 90, 92 to drive the pump mechanism 71. The lobed portion 84 may reciprocate the drive mechanism 72 twice per revolution of the drive shaft 76.

The fuel system 20 may additionally include an optional sound attenuating material (not shown) located within the valley 30 of the engine block 12 that may surround the fuel pump 62 to attenuate noise generated by the fuel pump 62. The location of the fuel pump 62 within the valley 30 of the engine block 12 provides a number of advantages including, but not limited to, providing a housing location for the sound attenuating material. The fuel pump location may additionally use the engine block 12 as a protective housing for the fuel pump 62.

In accordance with the exemplary embodiment, a fuel pump coolant cap assembly addresses the fuel temperature and emissions issues caused by heat transfer between the engine block mounting surface and the fuel pump. Furthermore, while the above examples are described individually, it will be understood by one of skill in the art having the benefit of this disclosure that amounts of elements described herein may be mixed and matched from the various examples within the scope of the appended claims.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel pump coolant cap assembly comprising:
   a fuel pump cap having a flanged bottom surface;
   a fuel pump support structure; and
   a fuel cooling ring disposed between the fuel pump cap and the fuel pump support structure, wherein a sealed coolant cavity is formed by a portion of an external surface of the fuel pump support structure and an internal surface of the fuel cooling ring.

2. The assembly of claim 1 further comprising a thermal barrier layer disposed between a top surface of the fuel cooling ring and the flanged bottom surface of the fuel pump cap.

3. The assembly of claim 2 wherein the thermal barrier layer is a thermal barrier coating.

4. The assembly of claim 2 wherein the thermal barrier layer is a gasket.

5. The assembly of claim 1 further comprising a thermal barrier layer disposed between a bottom surface of the fuel cooling ring and a mating surface of the fuel pump support structure.

6. The assembly of claim 1, wherein the fuel cooling ring further comprises a coolant input port and a coolant output port in communication with the sealed coolant cavity.

7. The assembly of claim 1 wherein the fuel cooling ring further comprising a phase change fluid injection port in communication with the sealed coolant cavity.

8. The assembly of claim 1 further comprising a first O-ring disposed adjacent a top end of the sealed coolant cavity and between the external surface of the fuel pump support structure and an internal surface of the fuel cooling ring.

9. The assembly of claim 8 further comprising a second O-ring disposed adjacent a bottom end of the sealed coolant cavity and between the external surface of the fuel pump support structure and an internal surface of the fuel cooling ring.

10. A fuel pump coolant cap assembly comprising:
    a fuel pump cap having a flanged bottom surface;
    a thermal barrier layer disposed between a top surface of the fuel cooling ring and the flanged bottom surface of the fuel pump cap;
    a fuel pump support structure; and
    a fuel cooling ring disposed between the fuel pump cap and the fuel pump support structure, wherein a sealed coolant cavity is formed by a portion of an external surface of the fuel pump support structure and an internal surface of the fuel cooling ring.

11. The assembly of claim 10 wherein the thermal barrier layer is a thermal barrier coating.

12. The assembly of claim 10 wherein the thermal barrier layer is a gasket.

13. The assembly of claim 10 further comprising a thermal barrier layer disposed between a bottom surface of the fuel cooling ring and a mating surface of the fuel pump support structure.

14. The assembly of claim 10, wherein the fuel cooling ring further comprises a coolant input port and a coolant output port in communication with the sealed coolant cavity.

15. The assembly of claim 10, wherein the fuel cooling ring further comprising a phase change fluid injection port in communication with the sealed coolant cavity.

16. The assembly of claim 10, further comprising a first O-ring disposed adjacent a top end of the sealed coolant cavity and between the external surface of the fuel pump support structure and an internal surface of the fuel cooling ring.

17. The assembly of claim 16 further comprising a second O-ring disposed adjacent a bottom end of the sealed coolant cavity and between the external surface of the fuel pump support structure and an internal surface of the fuel cooling ring.

* * * * *